(12) United States Patent  (10) Patent No.: US 8,549,194 B2
Inui  (45) Date of Patent: Oct. 1, 2013

(54) DATA TRANSMISSION APPARATUS, IMAGE PROCESSING APPARATUS AND PROGRAM OF THE SAME

(75) Inventor: Kazuo Inui, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 734 days.

(21) Appl. No.: 11/868,630

(22) Filed: Oct. 8, 2007

(65) Prior Publication Data

US 2008/0089341 A1  Apr. 17, 2008

(30) Foreign Application Priority Data

Oct. 11, 2006  (JP) ................................. 2006-277201

(51) Int. Cl.
*G06F 3/00* (2006.01)
*G06F 13/28* (2006.01)
*G06F 15/16* (2006.01)

(52) U.S. Cl.
USPC ................ 710/36; 710/28; 715/752; 709/206

(58) Field of Classification Search
USPC ....................... 710/36, 28; 709/206; 715/752
See application file for complete search history.

(56) References Cited

U.S. PATENT DOCUMENTS

| 7,646,786 | B2 * | 1/2010 | Droms et al. ................. 370/465 |
| 2003/0050927 | A1 * | 3/2003 | Hussam ............................ 707/5 |
| 2003/0191806 | A1 * | 10/2003 | Osterberg et al. ............. 709/206 |
| 2004/0003289 | A1 * | 1/2004 | Bhogal et al. ................. 713/201 |
| 2004/0010552 | A1 * | 1/2004 | Keohane et al. .............. 709/206 |
| 2004/0246517 | A1 * | 12/2004 | Parry ............................ 358/1.15 |
| 2006/0259557 | A1 * | 11/2006 | Lin et al. ....................... 709/206 |

FOREIGN PATENT DOCUMENTS

| JP | 5-197657 A | 8/1993 |
| JP | 6-319006 A | 11/1994 |
| JP | 08-139891 | 5/1996 |
| JP | 2001-217970 | 8/2001 |
| JP | 2002-222150 A | 8/2002 |
| JP | 2005-157770 | 6/2005 |
| JP | 2005-217879 | 8/2005 |
| JP | 2006-211533 | 8/2006 |
| JP | 2006-262023 | 9/2006 |

OTHER PUBLICATIONS

Notification of Reason(s) for Refusal in JP 2006-277201 dated Nov. 18, 2008, and a English Translation thereof.

* cited by examiner

*Primary Examiner* — Farley Abad
(74) *Attorney, Agent, or Firm* — Buchanan Ingersoll & Rooney PC

(57) ABSTRACT

There is provided a data transmission apparatus, an image processing apparatus and a program, capable of preventing data from being transmitted to a destination to which the data should not be transmitted, in the case where there is a possibility that the data is forwarded to a destination other than the destination designated at the time of the transmission. When an address designated as a transmission destination has a possibility that data is forwarded to another address, such as an address of a mailing list, a forward destination information determining/acquiring unit acquires the information of the forward destination. When the forward destination includes the address that does not correspond to the transmission-permitted address held in a transmission-permitted address holder unit, an e-mail transmission canceling unit cancels the transmission to the address to which the transmission is not permitted.

18 Claims, 12 Drawing Sheets

| E-MAIL ADDRESS | TIME AND DATE OF REGISTRATION | REGISTERED USER |
|---|---|---|
| david@abc.co.jp | 2006/07/07 11:09:53 | UserA |
| julie@abc.co.jp | 2006/07/07 11:11:23 | UserB |
| michael@abc.co.jp | 2006/07/07 11:13:10 | UserC |
| elton@abc.co.jp | 2006/07/07 11:15:42 | UserD |
| ⋮ | ⋮ | ⋮ |

Fig.6

| MAILING LIST ADDRESS | TIME AND DATE OF REGISTRATION | REGISTERED USER | FORWARDING ADDRESS |
|---|---|---|---|
| maillist1@abc.co.jp | 2006/07/09 14:22:23 | UserA | david@abc.co.jp, julie@abc.co.jp |
| maillist2@abc.co.jp | 2006/07/10 15:34:14 | UserD | david@abc.co.jp, john@efg.co.jp |
| ... | ... | ... | ... |

| E-MAIL ADDRESS | USER IDENTIFIER | AUTHORIZATION |
|---|---|---|
| david@abc.co.jp | DAVID | YES |
| julie@abc.co.jp | DAVID | YES |
| ⋮ | ⋮ | ⋮ |

DATA TRANSMISSION APPARATUS, IMAGE PROCESSING APPARATUS AND PROGRAM OF THE SAME

This application is based on the application No. 2006-277201 filed in Japan, the contents of which are hereby incorporated by reference.

BACKGROUND OF THE INVENTION

1. Field of the Invention

The present invention relates to a data transmission apparatus, an image processing apparatus, and a program of the same.

2. Description of the Related Art

In recent years, image processing apparatuses are capable of transmitting image data, which is obtained by reading a document with a scanner, for example, as attached to an electronic mail (referred to simply as "e-mail" or "mail", hereinafter), and transmitting image data to an external device in accordance with various protocols such as File Transfer Protocol (FTP) and Server Message Block (SMB).

As an example of a method of transmitting data to a plurality of destinations in a single transmission procedure, a method of using a mailing list is realized. However, in the mailing list in which a plurality of addresses (e-mail addresses) is registered, it is difficult to delete only one or more specific addresses from the addresses. Hence, JP No. 2002-222150 A discloses that some specific addresses of the mailing list are excluded using a distribution exclusion member specifier.

The function of transmitting data to a plurality of destinations in a single transmission procedure with the use of a mailing list or the like is very convenient, but an unfavorable situation might happen from the viewpoint of security management. That is, a user using e-mail addresses of a mailing list often does not recognize to which destinations the data is actually transmitted at the time of the transmission. On the other hand, in the case where an improper act is made such as cracking a server which manages the mailing list and rewriting some of the simultaneous transmission destinations, particularly in a situation where a number of simultaneous transmission destinations exists, there arises a problem of an information leakage without being recognized by an administrator. However, in the technique disclosed in JP No. 2002-222150 A, a specific name of an individual is excluded on the basis of recognition of the list of the destinations registered in the mailing list. It is practically almost impossible to recognize the destinations registered in the mailing list.

SUMMARY OF THE INVENTION

It is an object of the present invention to provide a data transmission apparatus, an image processing apparatus, and a program. Each can prevent data from being transmitted to a destination to which the data should not be transmitted in the case where there would be a possibility that data be forwarded to a destination different from the destination designated at the time of the transmission such as a usage of a mailing list.

The object described above is achieved by a data transmission apparatus according to a first aspect of the present invention. The data transmission apparatus has a data transmission function to the outside, and includes: a transmission-permitted address acquiring unit that acquires information on a transmission-permitted address that is a transmission destination to which data transmission is permitted; a transmission destination designation input receiving unit that receives an input for designating a transmission destination address; a forward destination information acquiring unit that acquires information of a forward destination when the transmission destination address designated and inputted has a possibility that the data is forwarded to another address; and a cancel unit that, when the forward destination includes a transmission destination to which the data transmission is not permitted, cancels (ceases) the data transmission to the transmission destination to which the data transmission is not permitted.

In the configuration according to the present invention, when the acquired forward destination includes a transmission destination to which the data transmission is not permitted, the data transmission to the transmission destination to which the data transmission is not permitted is cancelled (ceased), whereby the data transmission to the destination to which the data should not be transmitted can be prevented.

The object described above is also achieved by an image processing apparatus according to a second aspect of the present invention. The image processing apparatus includes: an image data reading unit that reads a document image to create image data; an image data transmitting unit that transmits the image data created by the image data reading unit to the outside; a transmission-permitted address acquiring unit that acquires information on a transmission-permitted address that is a transmission destination to which data transmission is permitted; a transmission destination designation input receiving unit that receives an input for designating a transmission destination address; a forward destination information acquiring unit that acquires information of a forward destination when the transmission destination address designated and inputted has a possibility that the data is forwarded to another address; and a cancel unit for, when the forward destination includes a transmission destination to which the data transmission is not permitted, cancels (ceases) the data transmission to the transmission destination to which the data transmission is not permitted.

The object described above is also achieved by a program according to a third aspect of the present invention. The program may be installed in an apparatus including a processor and operated on the processor. The program causes a processor to operate following processes. The processes include: a process that acquires information on a transmission-permitted address that is a transmission destination to which data transmission is permitted; a process that receives an input for designating a transmission destination address; a process that acquires information of a forward destination when the transmission destination address designated and inputted has a possibility that the data is forwarded to another address; and a process that, when the forward destination includes a transmission destination to which the data transmission is not permitted, cancels (ceases) the data transmission to the transmission destination to which the data transmission is not permitted.

The data transmission apparatus and the like according to the present invention provides an effect of preventing data transmission to a destination to which data should not be transmitted, in the case where there is a possibility that data is forwarded to a destination different from the destination designated at the time of the transmission.

Other objects and further features of the present invention will be apparent from the following detailed description when read in conjunction with the accompanying drawings.

BRIEF DESCRIPTION OF THE DRAWINGS

In the accompanying drawings:

FIG. 6 is a diagram of an example of contents of a mailing list address storing unit 323;

DETAILED DESCRIPTION OF THE PREFERRED EMBODIMENTS

Preferred embodiments of the present invention will be described with reference to the drawings, wherein the case in which a multifunction peripheral (MFP) is employed as an example of a device to which the data transmission apparatus and the image processing apparatus according to the present invention are applied is taken as an example.

(First Embodiment)

(1) Configuration of Data Transmission System

Figure 1:
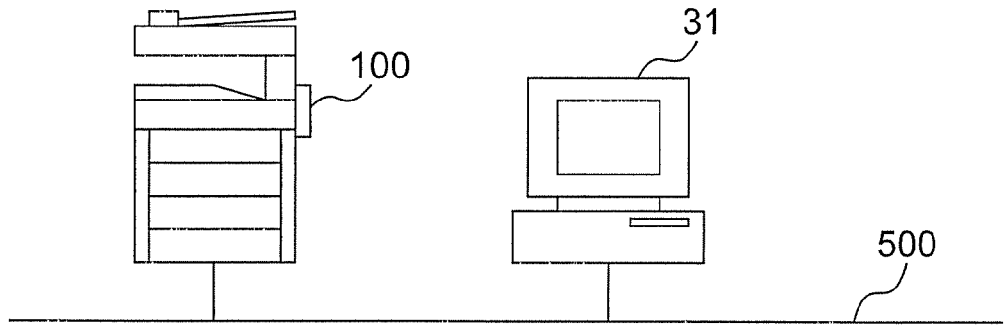
FIG. 1 is a diagram of an overall configuration of an example of a data transmission system according to a first embodiment of the present invention.

FIG. 1 is a diagram showing an overall configuration of an example of a data transmission system according to the present embodiment. The data transmission system is configured by an MFP 100 according to the present embodiment and an e-mail server 31, both being connected to a network 500 such as a Local Area Network (LAN). The MFP 100 is an image forming apparatus having functions of: a copying machine; a network printer; a scanner; a facsimile; a document server; and the like collectively. It is sometimes referred to as a complex machine, an All In One (AIO), or a Scan Print Copy (SPC). The e-mail server 31 can be configured by installing software into a personal computer (PC), for example.

(2) Configuration of MFP

Figure 2:
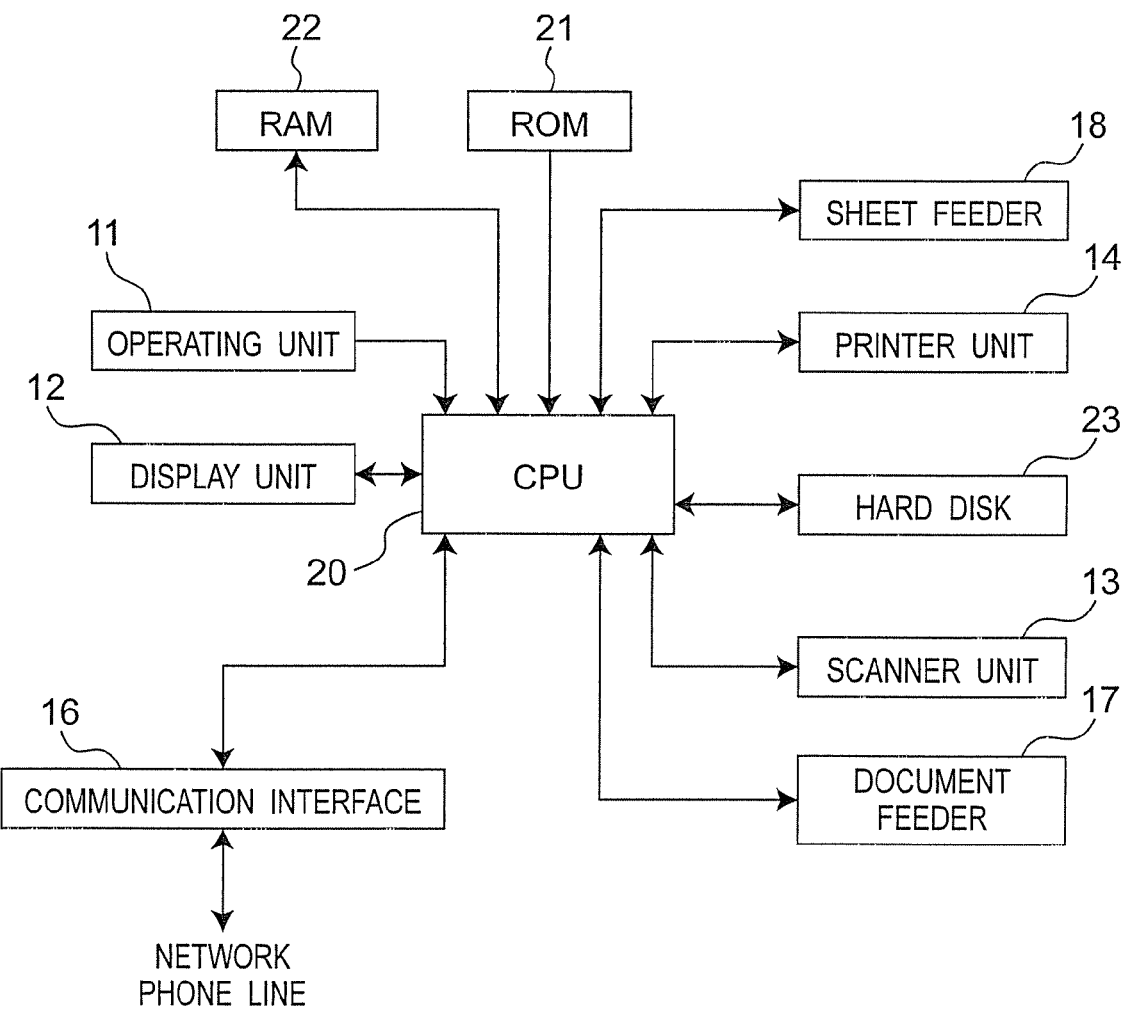
FIG. 2 is a diagram of an example of a hardware configuration of an MFP 100.

FIG. 2 is a diagram of an example of a hardware configuration of the MFP 100. The MFP 100 includes: an operating unit 11; a display unit 12; a scanner unit 13; a printer unit 14; a communication interface 16; a document feeder 17; a sheet feeder 18; a CPU 20; a ROM (read only memory) 21; a RAM (random access memory) 22; and a hard disk 23.

The operating unit 11 is configured by: a plurality of keys for inputting numerals, characters, and symbols; a sensor for recognizing the pressed key; a transmission circuit for transmitting a signal indicating the recognized key to the CPU 20; and the like.

The display unit 12 displays: a screen for displaying a message to a user; a screen for prompting a user to input contents of a setting or a process; a screen for indicating the result of processes performed by the MFP 100; and the like. In the present embodiment, a touch panel is used as the display unit 12. The touch panel may also be involved in the operating unit 11. The touch panel has a function of detecting the position in the touch panel touched by a user's finger and transmitting the signal indicating the detection result to the CPU 20.

The scanner unit 13 irradiates light on the surface of a document and reads the document image by detecting the reflected light to create digital image data (here, density data representing density of RGB or black). The image data thus obtained is used for the printing at the printer unit 14. In addition, the data is converted into a file of a format such as TIFF, PDF, JPEG or the like and then stored in the hard disk 23. The image data may be converted into facsimile data and used for facsimile transmission. The document feeder 17 is provided above the main body of the MFP 100 and used for sequentially feeding one or a plurality of documents to the scanner unit 13.

The printer unit 14 prints the image read by the scanner unit 13, an image of data transmitted from an external device such as a personal computer (PC) connected through the network 500 such as a Local Area Network (LAN), or an image of facsimile data received through facsimile, onto a recording sheet such as paper or film. The sheet feeder 18 is provided below the main body of the MFP 100 and used for feeding the recording sheet to the printer unit 14. The recording sheet on which the image is printed by the printer unit 14 is ejected onto a catch tray (not shown).

The communication interface 16 is a device for performing communication with the e-mail server 31 and the like through the network 500 and performing transmission and reception of a facsimile through a phone line. The communication interface 16 may include an network interface card (NIC), a modem, and/or a terminal adapter (TA), for example.

Stored in the ROM 21 are a program and data for realizing basic functions of the MFP 100 such as reading (scanning) an image, duplicating (copying) a document, transmitting or receiving facsimile data, printing via a network, and operating as a document server (box function). Furthermore, the ROM 21 stores programs and data for realizing the functions according to the present embodiment. Some or all of the programs or data may be installed in the hard disk 23. In this case, the program or data installed in the hard disk 23 may be loaded onto the RAM 22 as necessary. The functions described in the present embodiment can be realized not only by using the CPU 20 but also by using dedicated hardware. Moreover, some of the functions may be realized by using functions provided by a general-purpose program such as an operating system (OS).

Figure 3:
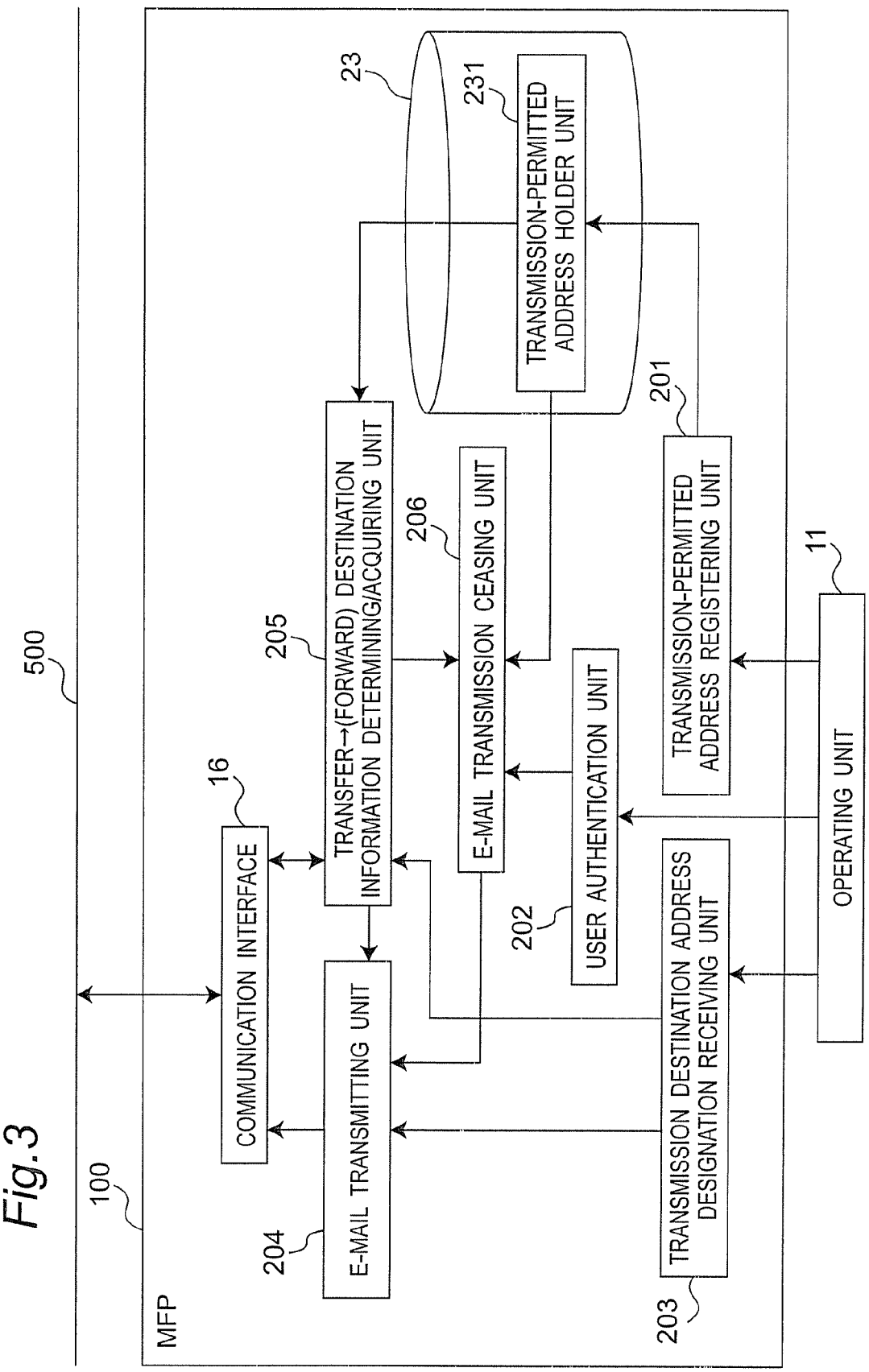
FIG. 3 is a block diagram for explaining an example of a functional configuration of the MFP 100.

FIG. 3 is a block diagram for explaining an example of the functional configuration of the MFP 100 according to the present embodiment. The MFP 100 includes: a transmission-permitted address registration unit 201; a user authentication unit 202; a transmission-destination address designation receiving unit 203; an e-mail transmitting unit 204; a forward destination information determining/acquiring unit 205; and an e-mail transmission canceling (ceasing) unit 206. The function of each units is realized by executing the program stored in the ROM 21 on the CPU 20. A transmission-permitted address holder unit 231 is provided in the hard disk 23.

Figures 4, 5:
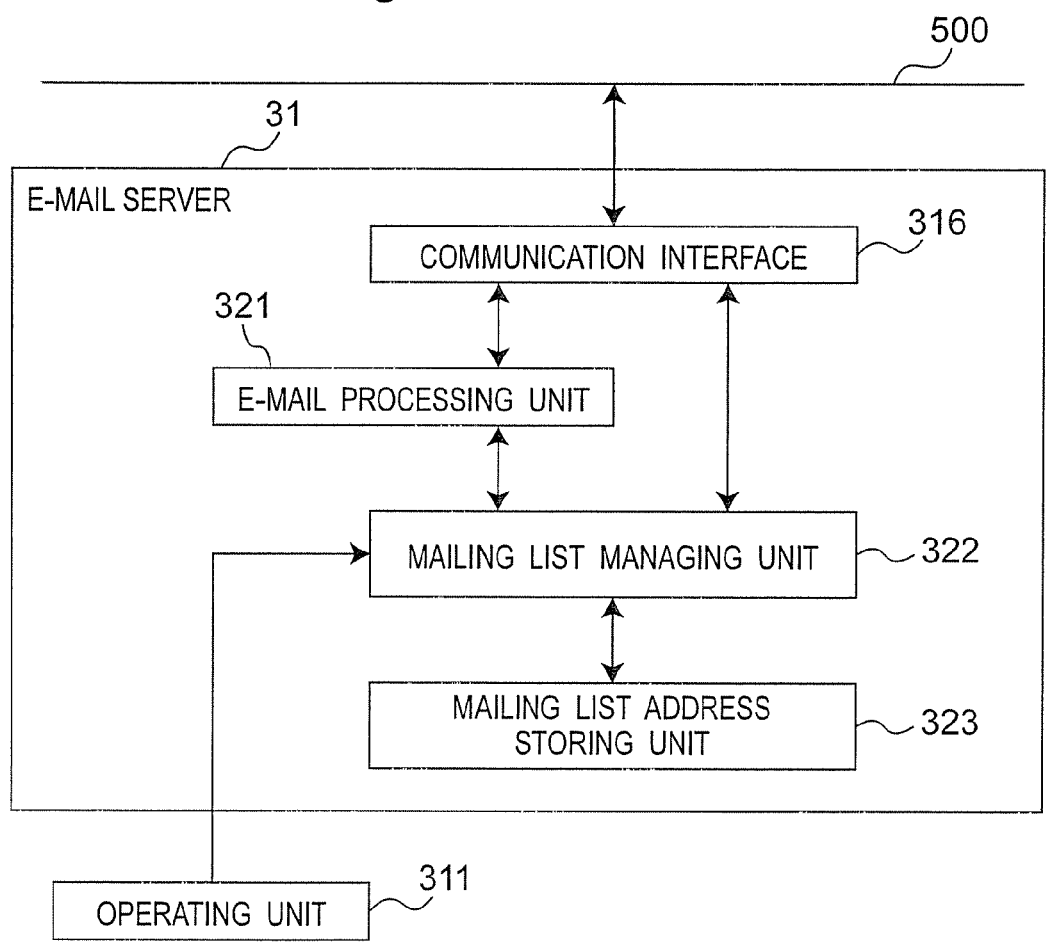
FIG. 4 is a diagram of an example of contents of a transmission-permitted address holder unit 231.
FIG. 5 is a block diagram of an example of a functional configuration of an e-mail server 31.

The transmission-permitted address registration unit 201 registers an e-mail address to which data transmission is permitted, through the input of a user via the operating unit 11. The registered e-mail address is stored in the transmission-permitted address holder unit 231. FIG. 4 is a diagram of an example of the content of the transmission-permitted address holder unit 231 in the present embodiment. The transmission-permitted address holder unit 231 stores e-mail addresses to each of which the data transmission is permitted, pairs of date and time at which each of the e-mail addresses are registered, and users who performed the registration operation, but the items to be stored are not limited to these items.

In the present embodiment, transmission by an e-mail is assumed as a data transmission method. The transmission-permitted address holder unit 231 holds transmission-destination e-mail addresses as the addresses to which the transmission is permitted. The transmission-permitted address may be acquired from the outside through the network 500 or the like, in addition to the registration through the operating unit 11.

The user authentication unit 202 determines whether or not login be permitted to a user on the basis of a user identifier and authentication information such as a password inputted by the user through the operating unit 11. The user authentication can be done by using an external authentication server.

The transmission-destination designation receiving unit 203 receives the input from the user for designating a transmission destination through the operating unit 11. The e-mail transmitting unit 204 transmits an e-mail to the designated e-mail address. In the present embodiment, detailed description on the e-mail transmission is omitted.

The forward destination information determining/acquiring unit 205 determines whether or not the e-mail address designated by the user is an address having a possibility of forwarding to another address. If the e-mail address is the address having the possibility of the forwarding, the information of the forward destination is acquired through the network 500. In the present embodiment, the contents of the transmission-permitted address holder unit 231 are referred and, when the e-mail address designated as the transmission destination is not registered as the transmission-permitted address, the transmission of the information about the forward destination can be requested to the e-mail server 31.

There are, as a matter of course, other methods of determining the possibility of the forwarding. For example, a method can be employed in which the addresses of a mailing list should be separately registered. The configuration of the e-mail server 31 according to the present embodiment will briefly be described. FIG. 5 is a block diagram of an example of a functional configuration of the e-mail server 31.

The e-mail server 31 includes: an operating unit 311; a communication interface 316; an e-mail processing unit 321; a mailing list managing unit 322; and a mailing list address storing unit 323. The functions of the e-mail processing unit 321 and the mailing list managing unit 322 can be realized by operating a program on a CPU provided in the e-mail server 31 (not shown).

A keyboard or a mouse, for example, is used as the operating unit 311. The communication interface 316 controls the communication with the MFP 100 or the like through the network 500. An NIC (network interface card), for example, can be used as the communication interface 316.

The e-mail processing unit 321 performs transmission and reception of an e-mail. The mailing list managing unit 322 carries out: registration of a new mailing list; registration of an actual transmission destination address; deletion of a mailing list; and the like. The mailing list storing unit 323 can be provided in, for example, a hard disk in the e-mail server 31 (not shown).

FIG. 6 is a diagram of an example of the contents of the mailing list address storing unit 323. In the present embodiment, the mailing list address storing unit 323 stores addresses of mailing lists, pairs of date and time at which each of the mailing lists is registered, a user who registered each of the mailing lists, and e-mail addresses of forward destinations. However, the items to be stored are not limited thereto. The mailing list address storing unit 323 may store a pair of date and time when the mailing list is updated, the latest date and time when the mailing list is used, and the like.

The e-mail server 31 returns the addresses of the forward destinations in response to the inquiry from the MFP 100, which designates the address of interest. For example, when the MFP 100 designates "maillist1@abc.co.jp" as the transmission destination address, the forward destination information determining/acquiring unit 205 makes an inquiry to the e-mail server 31 for the forwarding address of the mailing list. The e-mail server 31 returns "david@abc.co.jp" and "julie@abc.co.jp" as the forwarding address.

On the other hand, the e-mail processing unit 321 forwards an e-mail to the address registered as the forwarding address, when receiving the e-mail that designates an address of the mailing list as the transmission destination of the e-mail.

Referring back to FIG. 3, when the forwarding ADDRESS acquired from the e-mail server 31 includes an address that is not held at the transmission-permitted address holder unit 231 as the transmission-permitted address, the e-mail transmission canceling unit 206 cancels (ceases) the transmission of the e-mail. The method of the cancellation will be described in detail below.

(3) Processes in MFP

Figure 7:
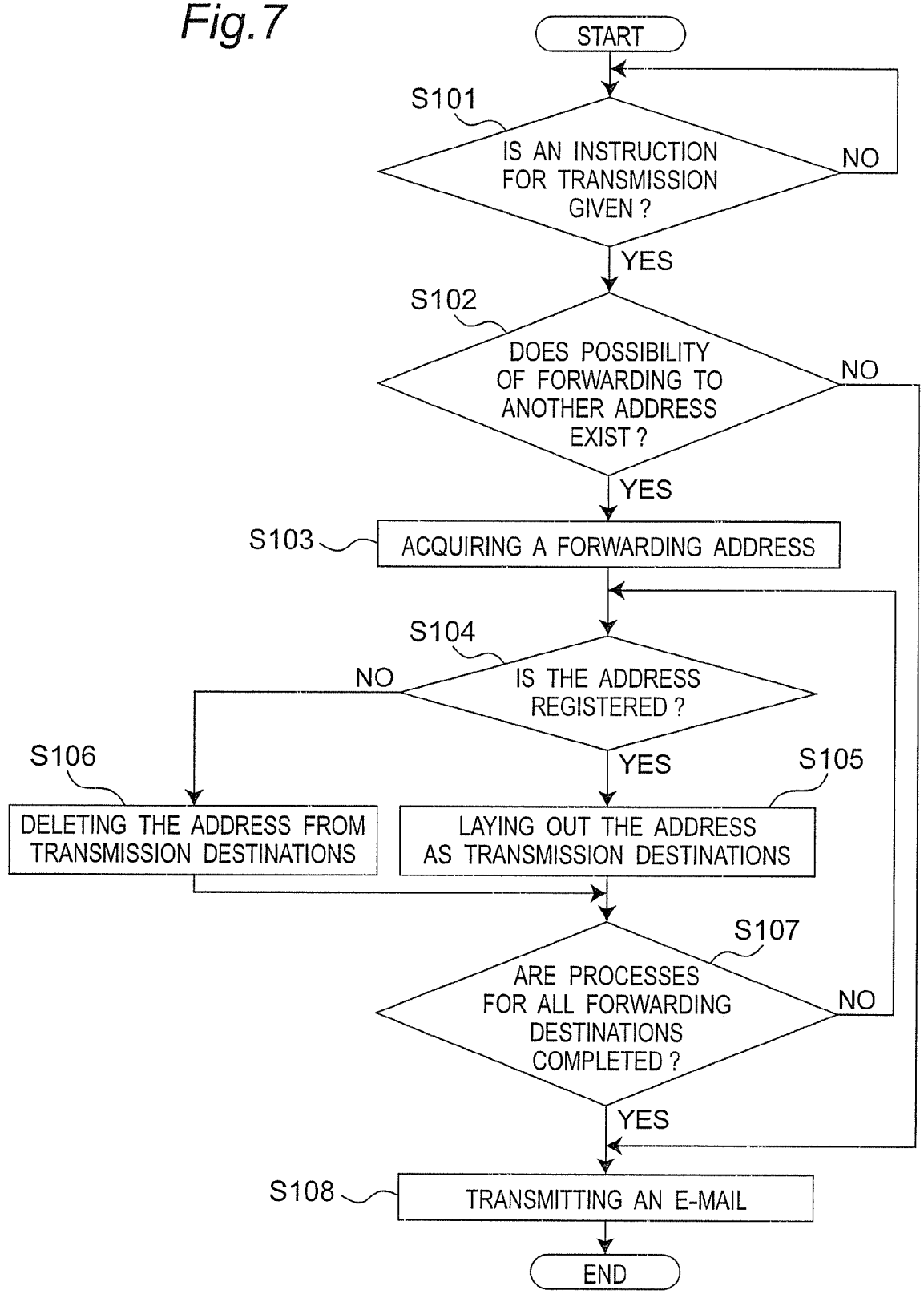
FIG. 7 is a flowchart for explaining an example of processes in the MFP 100.

Processes in the MFP 100 will be described. FIG. 7 is a flowchart for explaining an example of the processes of the MFP 100 according to the present embodiment. The process explained in the flowchart is also generally realized by operating a program stored in the ROM 21 on the CPU 20.

When an instruction for transmitting an e-mail with the designation of the transmission destination address is given (S101: YES), the forward destination information determining/acquiring unit 205 determines whether or not the designated address has a possibility of forwarding the e-mail to another address (S102).

When there is no possibility of the forwarding to another address (S102: NO), the e-mail transmitting unit 204 transmits the e-mail (S108). When there is a possibility of the forwarding to another address (S102: YES), the forward destination information determining/acquiring unit 205 inquires the forwarding address to the e-mail server 31 as described above to acquire the forwarding address (S103). The method of acquiring the forwarding address is not limited to the inquiry at the e-mail server 31. For example, the forwarding address can be acquired by making an inquiry at another server for which the MFP 100 has authorization.

After the forwarding address is acquired, it is determined whether or not the address is registered in the transmission-permitted address holder unit 231 (S104). In the present embodiment, a process of laying out the e-mail address of the transmission destination is performed without transmitting the e-mail to the address of the mailing list. Specifically, the address registered as the transmission-permitted address (S104: YES) is laid out as the transmission destination address (S105), while the address not registered as the transmission-permitted address (S104: NO) is deleted from the transmission destination address (S106).

Figure 8:
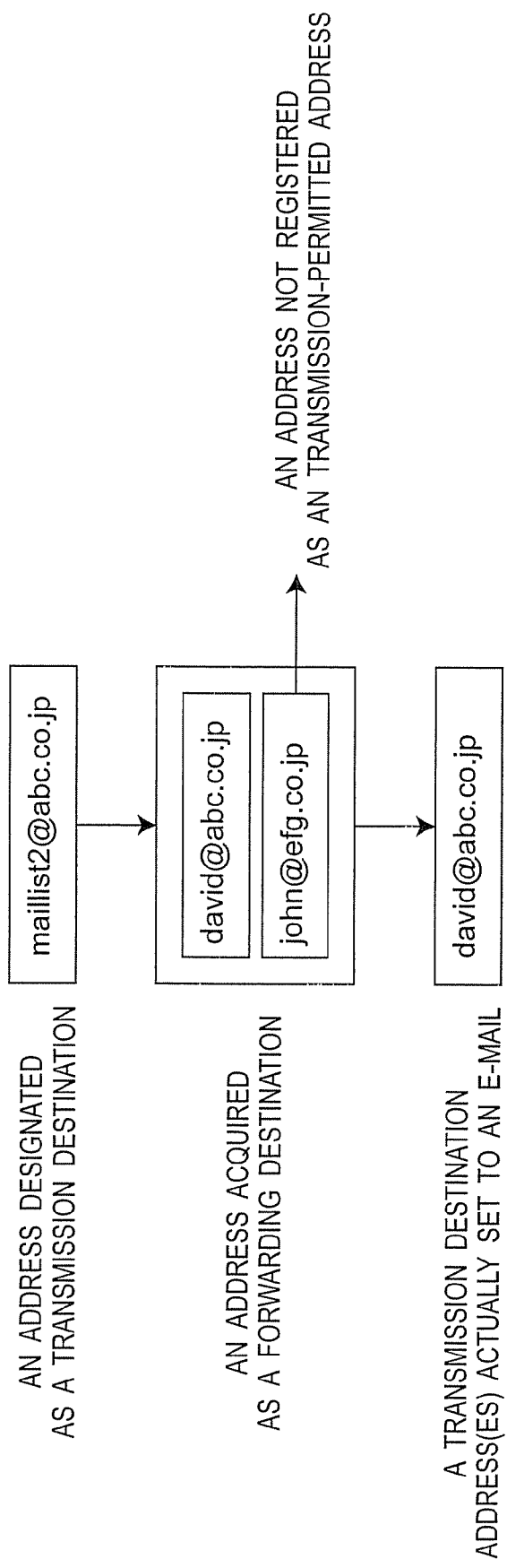
FIG. 8 is an illustration for explaining a laying-out process of a transmission destination e-mail address.

FIG. 8 is an illustration for explaining the lay-out process of the e-mail address of the transmission destination. When "maillist2@abc.co.jp" is designated as the transmission destination address, "david@abc.co.jp" and "john@efg.co.jp" are acquired as the forwarding addresses. However, since the address "john@efg.co.jp" is not registered as the transmission-permitted address, this address is deleted from the transmission destination in the present embodiment, whereby the transmission destination address of the e-mail transmitted from the MFP 100 is only "david@abc.co.jp". When all the forwarding addresses are not registered as the transmission-permitted address, the e-mail transmission process (S108) is not executed.

Figure 9:
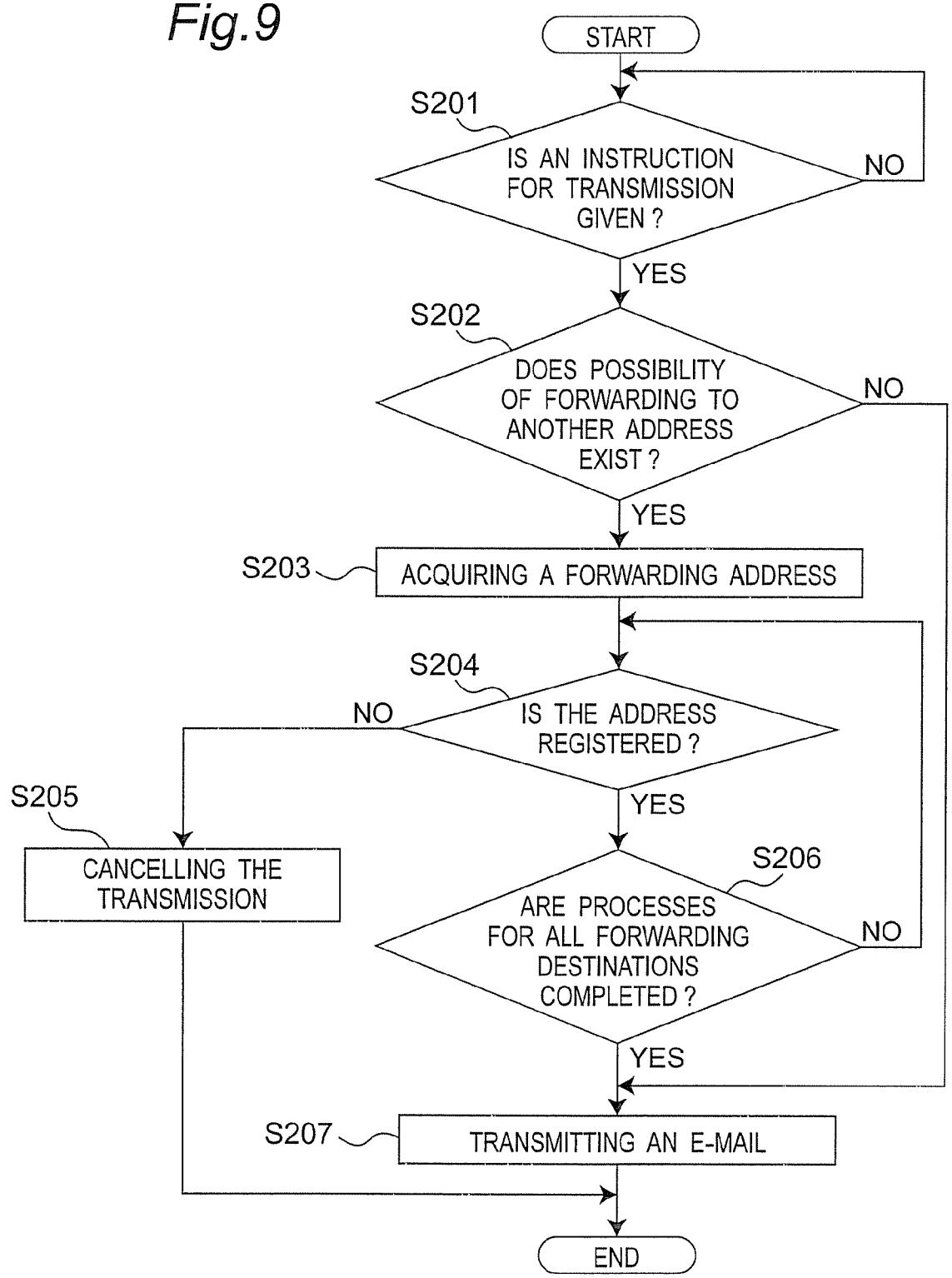
FIG. 9 is a flowchart for explaining another example of the processes in the MFP 100.

FIG. 9 is a flowchart for explaining an example of processes in the MFP 100. Steps S201 to S204 are the same as those in FIG. 7, so that the description thereof is omitted. In the example of FIG. 9, when there is any one address that is not registered as the transmission-permitted address among the acquired forwarding addresses (S204: NO), the e-mail transmission is cancelled (ceased) (S205). That is, when all of the forwarding addresses are the transmission-permitted addresses (S206: YES), the e-mail is transmitted (S207). In this case, the address set as the transmission destination address of the e-mail may be the address of the mailing list.

Figure 10:
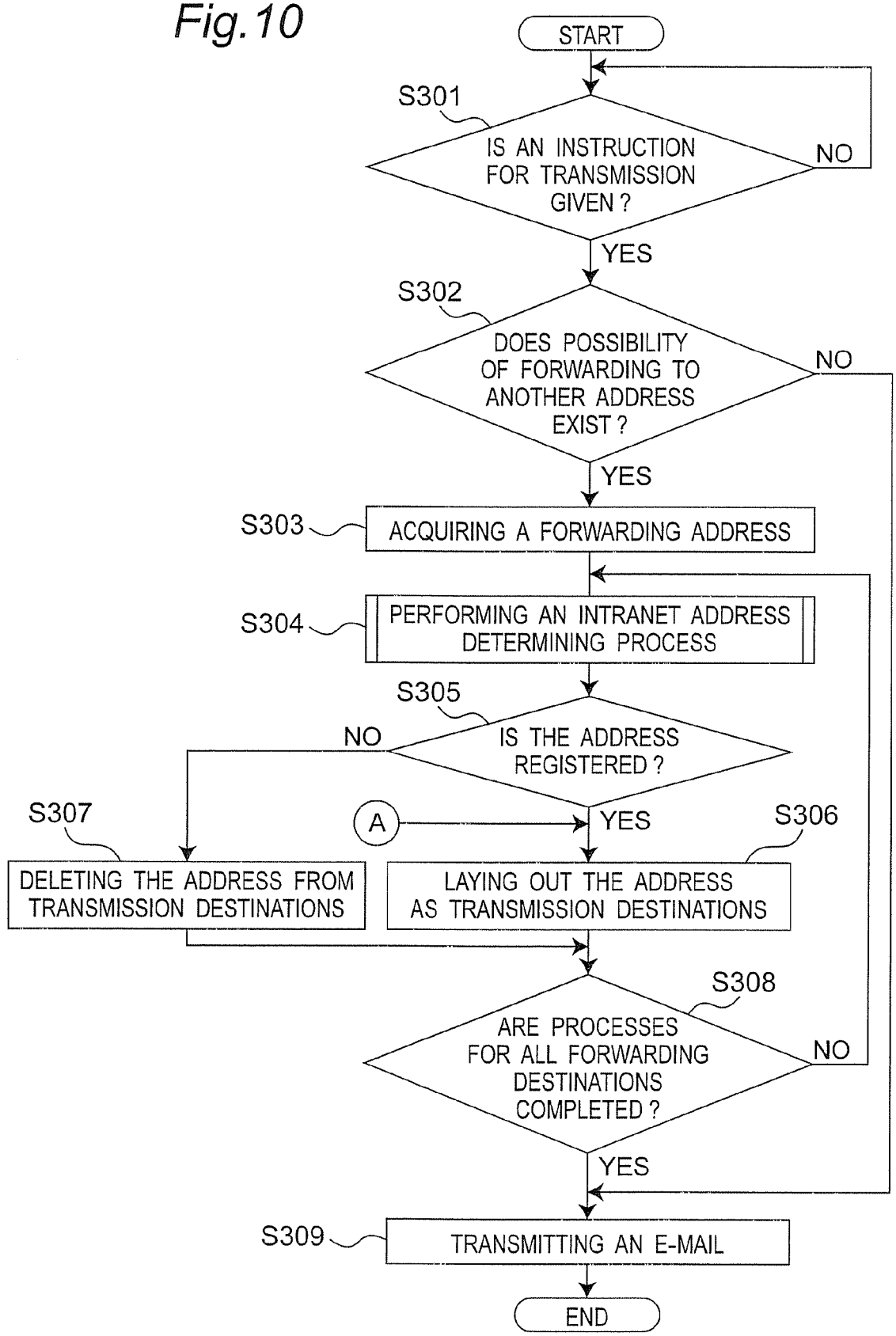
FIG. 10 is a flowchart for explaining another example of the processes in the MFP 100.
Figure 11:
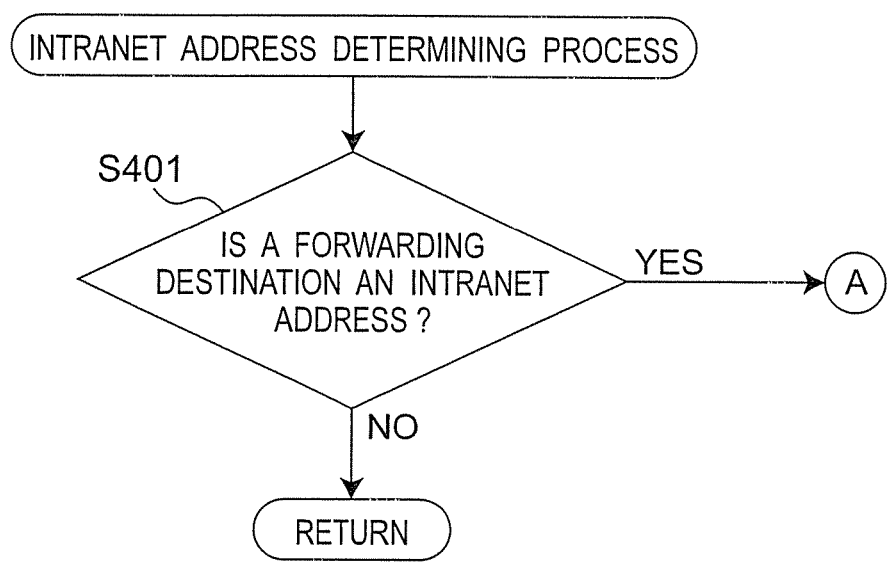
FIG. 11 is a flowchart for explaining an intranet address determining process.

FIG. 10 is a flowchart for explaining an example of other processes in the MFP 100. Steps S301 to S303 are the same as those in FIG. 7, so that the description thereof is omitted. In the example of FIG. 10, an intranet address determining process (S304) is executed after the forwarding address is acquired. FIG. 11 is a flowchart for explaining the intranet address determining process. In the intranet address determining process, it is determined whether or not the forwarding address is an intranet address (S401). If it is an intranet address (S401: YES), the process proceeds to S306 in FIG. 10 where this address is defined as the transmission destination without determining whether or not it is registered as the transmission-permitted address. It should be noted that the intranet represents an in-house network. If the e-mail address, which is not included in the transmission-permitted address, is within the company, it can be determined that security with a certain standard be secured.

When it is not an intranet address (S401: NO), the process returns to the flowchart shown in FIG. 10 so as to determine whether it is registered as the transmission-permitted address or not (S305). It may be possible that whether it is an intranet address or not is determined by referring to the domain name of the e-mail address. By configuring that when the domain name of the e-mail address is "abc.co.jp" it is determined as an intranet address, only the address outside the company could be registered as the transmission-permitted address, whereby the load for registering the transmission-permitted address can be reduced.

Figure 12:
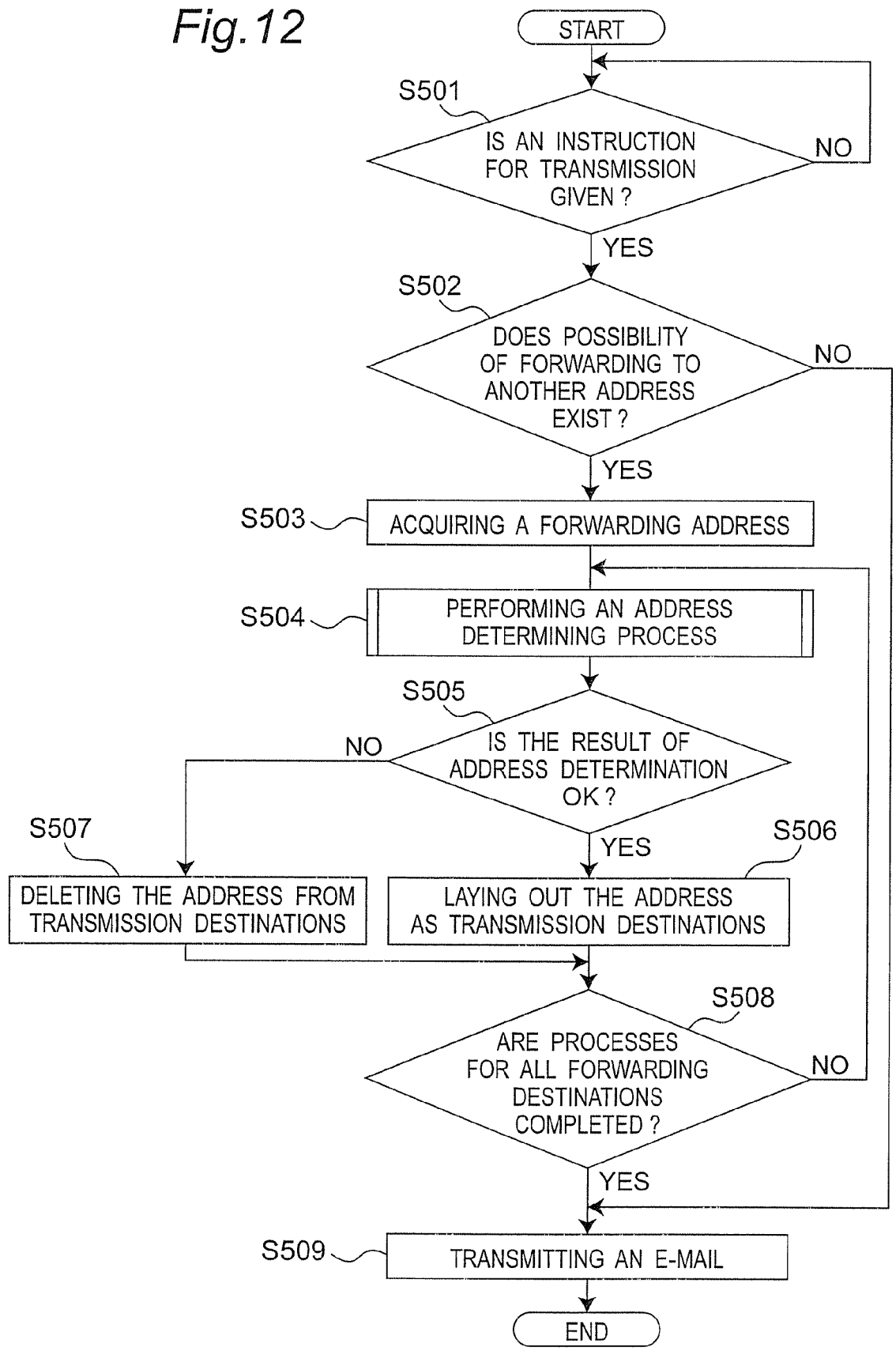
FIG. 12 is a flowchart for explaining another example of the processes in the MFP 100.

FIG. 12 is a flowchart for explaining another example of processes in the MFP 100. The processes of FIG. 12 are different from those of FIG. 10 in that the address determining process is executed after the forwarding address is acquired (S504), and it is determined (S505) whether the forwarding address is laid out as the transmission destination (S506) or deleted from the transmission destination (S507) on the basis of the result of the determination of the address determining process.

Figures 13, 14:
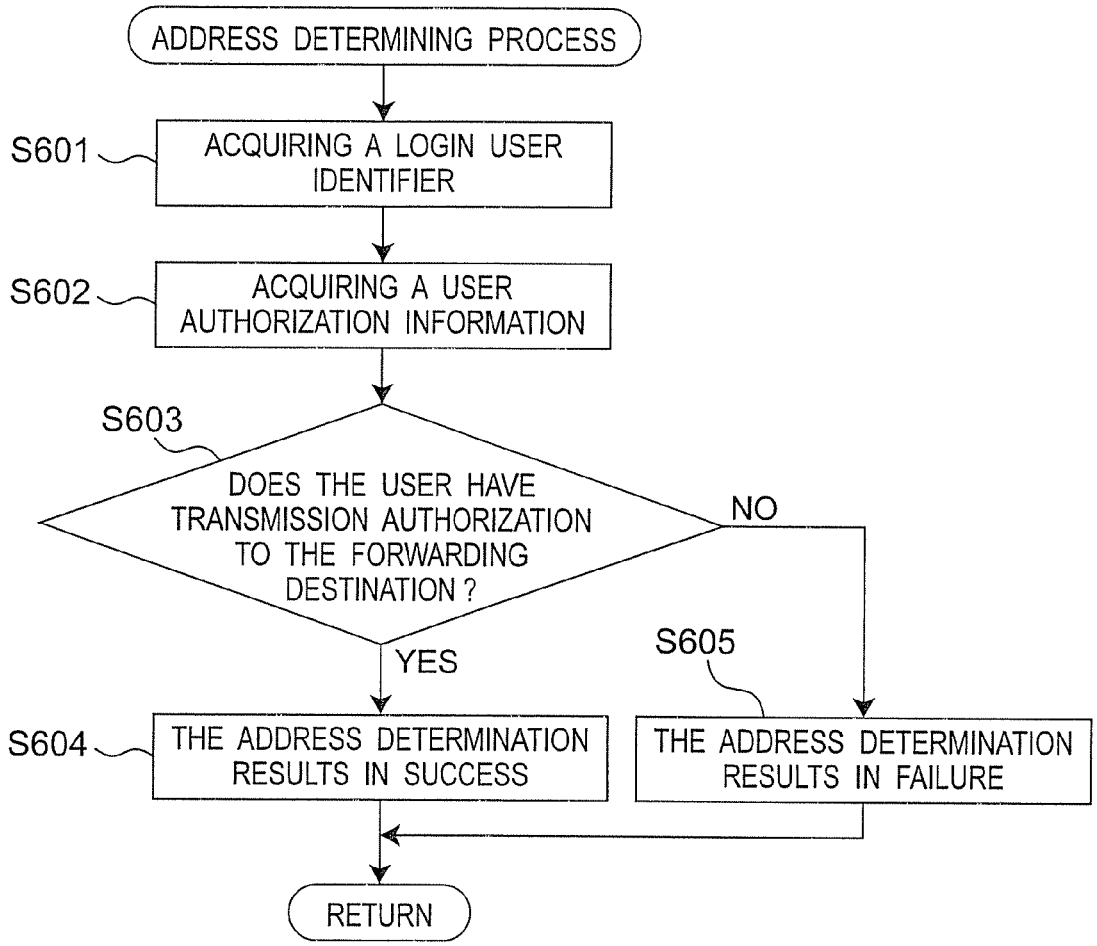
FIG. 13 is a flowchart for explaining an example of an address determining process.
FIG. 14 is a diagram of an example of contents of user authorization information.

FIG. 13 is a flowchart for explaining an example of the address determining process. In the example in FIG. 13, it is determined whether or not the user has authorization of the transmission to the address on the basis of the identifier of the login user received by the user authentication unit 201.

Specifically, in the address determining process of FIG. 13, the identifier of the login user is acquired (S601), and then, the user authorization information is acquired (S602). FIG. 14 is a diagram of an example of contents of the user authorization information. The user authorization information holds authorization of the transmission to the transmission destination address for every user. The example in FIG. 14 indicates that the user having the user identifier "DAVID" has authorization of the transmission to the transmission destination addresses "david@abc.co.jp" and "julie@abc.co.jp".

When the user has the authorization of the transmission to the forward destination as a result of the reference to the user authorization information (S603: YES), the result of the address determination becomes successful (S604), so that the process returns to the flowchart in FIG. 12. When the user does not have the authorization of the transmission to the forward destination (S603: NO), the result of the address determination becomes failure (S605).

Returning to the flowchart in FIG. 12, when the result of the address determination is successful (S505: YES), the forward destination is laid out as the transmission destination (S506), while when the result of the address determination is failure (S505: NO), the forward destination is deleted from the transmission destination (S507). The processes after these processes are the same as those in steps S105 to S108 in FIG. 7, so that the detailed description is omitted. The permission of the transmission according to the status of the user can be set by referring to the user identifier, as described above.

(Second Embodiment)

A second embodiment of the present invention will be described next. In the first embodiment, the case in which the e-mail transmission is executed as one embodiment of the data transmission has been described in detail. However, the data transmission is not limited to the e-mail transmission. There are various methods such as FTP, SMB or the like. The present invention is applicable to various data transmission protocol, and various environments of data transmission system, so long as there is a possibility of data being forwarded to an address other than the designated transmission destination address, and the information of the forward destination can be acquired.

The data transmission in the present invention can be considered including facsimile transmission. For example, when facsimile transmission is executed to a certain facsimile number, and it is set such that the transmitted data is forwarded to another facsimile number, the facsimile number is registered as the transmission-permitted address if the facsimile number of the forward destination can be acquired, whereby the present invention is applicable to this case.

As an example of a further complicated environment, there is the case in which, when data is transmitted not to the e-mail server 31 but to, for example, another MFP, the data is automatically forwarded to a forward destination set at the another MFP.

Figure 15:
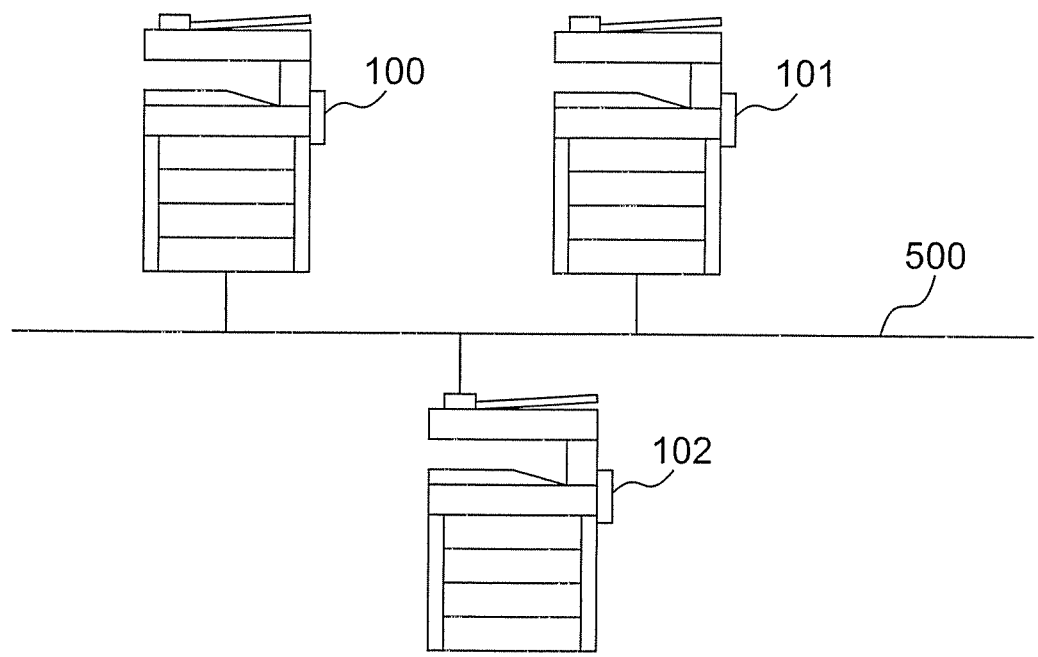
FIG. 15 is a diagram of an overall configuration of an example of a network system according a second embodiment.

The present invention is also applicable to this case. Specifically, as FIG. 15 shows one example, when the MFP 100, an MFP 101, and an MFP 102 are connected through the network 500, it is assumed that the forward destination of the data received by the MFP 101 is registered beforehand. For example, it can be set such that the data transmitted to the MFP 101 is automatically forwarded to the MFP 102.

When the data is transmitted to the MFP 101 from the MFP 100 in this case, the possibility of forwarding is first inquired to the MFP 101. When the automatic forwarding setting is made, the address of the forward destination MFP is acquired. The transmission-permitted address in this case can be registered in the form of an IP address, for example.

The IP address of the MFP 102 can be acquired as the forward destination by the response from the MFP 101. When the IP address of the MFP 102 is not included in the transmission-permitted address registered in the MFP 100, the data transmission to the MFP 101 can be cancelled.

The process for canceling the data transmission described in the each of the above embodiments provides a great practical effect in, for example, the case described below. That is, considered cases include the case of a joint project where there are created a mailing list in which the e-mail addresses of the members in a company and the addresses of the members outside the company are mixed or a mailing list in which the e-mail addresses of the members at a plurality of departments in the company are mixed, and automatic forwarding to the outside of the company is temporarily set.

However, when the maintenance of the setting of the forwarding addresses is insufficient after the completion of the project, the registration of the forward destination to which data should not be transmitted might remain. In this case, the data transmission to the forward destination continues, resulting in a risk of information leakage. The process of canceling the transmission described in the above embodiments can prevent data from being transmitted to a wrong forward destination.

(Modification)

The embodiments according to the present invention have been described above. It is needless to say that the present invention is not limited by the specific examples described in the above embodiments, and modifications described below may be possible, for example.

(1) The first embodiment describes the case in which the transmission-permitted address is registered in the transmission-permitted address holder unit 231. However, the configuration of registering a transmission-prohibited address may be employed. Further, the configuration of registering both of the transmission-permitted address and transmission-prohibited address, and the setting as to whether the transmission is permitted or not for each address may be employed. There are various conceivable methods for setting permission and prohibition of the transmission considered for every transmission destination, including the configuration of holding the setting of the permission and prohibition of the transmission for every user, or the configuration of holding the setting of the permission and prohibition of the transmission for groups (e.g., departments) to which users belong.

(2) In the case where the image data obtained by reading a document by the scanner unit 13 is transmitted to the outside as an attachment to an e-mail, there may be the case in which a transmission destination address is designated and inputted prior to the reading of the document at the scanner unit 13. In this case, the process as described in the above embodiments is executed prior to the reading of the document, and if there is a possibility that the data is forwarded to a transmission destination to which the data should not be transmitted, it is possible to perform control such that the document is not read.

(3) The control method can be set for every document. For example, such a configuration is possible that the information indicating whether the process described in the above embodiments is executed or not or the information indicating permission or prohibition of the transmission is held in a background pattern image (a tint block) of a document or an IC card embedded into the document.

(4) In the above embodiments, the transmission-permitted address is stored in the hard disk 23. However, in order to reduce the possibility that the information of the transmission-permitted address is falsified, the transmission-permitted address may be stored in, for example, an external storage medium such as an USB memory and a memory card, and the information on the transmission-permitted address may be acquired from the recording medium.

The present invention is applicable to, for example, an image processing apparatus or a data transmission apparatus such as an MFP.

The present invention is also applicable to a document management device that is installed to an MFP, or the like. The present invention is further also applicable to a computer program stored on a computer readable medium such as a flexible disk (FD), a compact disc read only memory (CD-ROM), or the like.

What is claimed is:

1. A data transmission apparatus having a data transmission function to the outside, comprising:
    a controller;
    a transmission-permitted address acquiring unit that acquires information on a transmission-permitted address that is an address to which data transmission is permitted;
    a transmission destination designation input receiving unit that receives an input for designating a first address;
    a first determination unit that determines, before data transmission to the first address, whether or not the designated first address has a possibility of being forwarded to a second address which is different from the first address;
    a forward destination information acquiring unit that acquires information of a forward destination corresponding to the designated first address when it is determined that the designated first address has the possibility of being forwarded to the second address;
    a second determination unit that determines, before data transmission to the first address, whether or not the acquired forward destination includes an address to which the data transmission is not permitted based on the transmission-permitted address acquired by the transmission-permitted address acquiring unit; and
    a cancel unit that, when it is determined that the forward destination includes an address to which the data transmission is not permitted, cancels the data transmission to the address to which the data transmission is not permitted,
    wherein when the first address is an address of a mailing list, the controller automatically deletes addresses in the mailing list to which the data transmission is not permitted and sets any of the addresses in the mailing list which are transmission-permitted addresses as first addresses, and
    wherein the cancel unit ceases all of the data transmission when the forward destination includes any one address to which the data transmission is not permitted.

2. The data transmission apparatus according to claim 1, wherein
    the first address is an e-mail address.

3. The data transmission apparatus according to claim 2, wherein
    when the e-mail address is an address of a mailing list, the forward destination information acquiring unit acquires an e-mail address registered as an actual address of the mailing list.

4. The data transmission apparatus according to claim 1, wherein
    the cancel unit deletes the address to which the data transmission is not permitted from the forward destination, and performs the data transmission to the transmission-permitted address.

5. The data transmission apparatus according to claim 1, wherein
    the cancel unit transmits data when the forward destination satisfies a predetermined condition even if the address is not included in the transmission-permitted address.

6. The data transmission apparatus according to claim 5, wherein
the predetermined condition corresponds to a case in which the address is an e-mail address with a domain name that has a predetermined value.

7. The data transmission apparatus according to claim 1, further comprising:
a user identifier acquiring unit that acquires a user identifier, wherein
the cancel unit controls the cancellation of the data transmission by referring to the authorization given to the user.

8. The data transmission apparatus according to claim 1, wherein
the transmission-permitted address acquiring unit acquires information on the transmission-permitted address from a recording medium externally mounted to the data transmission apparatus.

9. An image processing apparatus comprising:
an image data reading unit that reads a document image to create image data;
an image data transmitting unit that transmits the image data created by said image data reading unit, to the outside;
a controller;
a transmission-permitted address acquiring unit that acquiring information on a transmission-permitted address that is an address to which data transmission is permitted;
a transmission destination designation input receiving unit that receives an input for designating a first address;
a first determination unit that determines, before data transmission to the first address, whether or not the designated first address has a possibility of being forwarded to a second address which is different from the first address;
a forward destination information acquiring unit that acquires information of a forward destination corresponding to the designated first address when it is determined that the designated first address has the possibility of being forwarded to the second address;
a second determination unit that determines, before data transmission to the first address, whether or not the acquired forward destination includes an address to which the data transmission is not permitted based on the transmission-permitted address acquired by the transmission-permitted address acquiring unit; and
a cancel unit that, when it is determined that the forward destination includes an address to which the data transmission is not permitted, cancels the data transmission to the address to which the data transmission is not permitted,
wherein when the first address is an address of a mailing list, the controller automatically deletes addresses in the mailing list to which the data transmission is not permitted and sets any of the addresses in the mailing list which are transmission-permitted addresses as first addresses, and
wherein the cancel unit ceases all of the data transmission when the forward destination includes any one address to which the data transmission is not permitted.

10. The image processing apparatus according to claim 9, wherein
the first address is an e-mail address.

11. The image processing apparatus according to claim 10, wherein
when the e-mail address is an address of a mailing list, said forward destination information acquiring unit acquires an e-mail address registered as an actual address of the mailing list.

12. The image processing apparatus according to claim 9, wherein
the cancel unit deletes the address to which the data transmission is not permitted from the forward destination, and performs the data transmission to the transmission-permitted address.

13. The image processing apparatus according to claim 9, wherein
the cancel unit transmits data when the forward destination satisfies a predetermined condition even if the address is not included in the transmission-permitted address.

14. The image processing apparatus according to claim 13, wherein
the predetermined condition corresponds to a case in which the address is an e-mail address with a domain name that has a predetermined value.

15. The image processing apparatus according to claim 9, further comprising:
a user identifier acquiring unit that acquires an identifier of a login user, wherein
the cancel unit controls the cancellation of the data transmission by referring to the authorization given to the login user.

16. The image processing apparatus according to claim 9, further comprising:
a document authorization setting information acquiring unit that acquires information of authorization given for every document, wherein
the cancel unit controls the cancellation of the data transmission by referring to the authorization given to the document.

17. The image processing apparatus according to claim 9, wherein
the transmission-permitted address acquiring unit acquires information on the transmission-permitted address from a recording medium externally mounted to the image processing apparatus.

18. A non-transitory computer readable medium storing a computer program for causing a processor to operate processes comprising:
code that acquires information on a transmission-permitted address that is an address to which data transmission is permitted;
code that receives an input for designating a first address;
code that determines, before data transmission to the first address, whether or not the designated first address has a possibility of being forwarded to a second address which is different from the first address;
code that acquires information of a forward destination corresponding to the designated first address when it is determined that the designated first address has the possibility of being forwarded to the second address;
code that determines, before data transmission to the first address, whether or not the acquired forward destination includes an address to which the data transmission is not permitted based on the acquired transmission-permitted address;
code that, when it is determined that the forward destination includes an address to which the data transmission is not permitted, cancels the data transmission to the address to which the data transmission is not permitted;

code that, when the first address is an address of a mailing list, automatically deletes addresses in the mailing list to which the data transmission is not permitted and sets any of the addresses in the mailing list which are transmission-permitted addresses as first addresses, and code that ceases all of the data transmission when the forward destination includes any one address to which the data transmission is not permitted.

* * * * *